(12) United States Patent
Whittaker

(10) Patent No.: US 6,912,339 B2
(45) Date of Patent: *Jun. 28, 2005

(54) OPTICAL INTERFACE DEVICES HAVING BALANCED AMPLIFICATION

(75) Inventor: G. Allan Whittaker, Alpharetta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/280,967

(22) Filed: Oct. 25, 2002

(65) Prior Publication Data

US 2004/0062474 A1 Apr. 1, 2004

Related U.S. Application Data

(60) Provisional application No. 60/414,746, filed on Sep. 27, 2002.

(51) Int. Cl.[7] .............................................. H04B 10/207
(52) U.S. Cl. ........................................................ 385/24
(58) Field of Search ............................................ 385/24

(56) References Cited

U.S. PATENT DOCUMENTS

| | | |
|---|---|---|
| 3,883,217 A | 5/1975 | Love et al. |
| 3,887,876 A | 6/1975 | Zeldler |
| 3,936,141 A | 2/1976 | Milton |

(Continued)

FOREIGN PATENT DOCUMENTS

| | | |
|---|---|---|
| DE | 3007958 A1 | 3/1984 |
| DE | 3807072 A1 | 8/1988 |
| DE | 3938856 A1 | 11/1989 |
| DE | 4331330 A1 | 9/1993 |
| DE | 4226838 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 231 635 A2 | 8/1987 |
| EP | 0 356 090 A2 | 2/1990 |

(Continued)

OTHER PUBLICATIONS

Whittaker et al., "Optical Distribution Network . . . ", Pub. No: 2004/0076434 A1, publication date: Apr. 22, 2004.*
International Search Report in related Application No. PCT/US03/30326.

(Continued)

*Primary Examiner*—Nikita Wells
*Assistant Examiner*—Zia R. Hashmi
(74) *Attorney, Agent, or Firm*—Kilpatrick Stockton LLP (57) ABSTRACT

An optical interface devices (OID) routes signals entering each of its ports to all other ports. The OID passively routes the optical signals and performs no conversion of the signals into the electrical domain. In addition to signal routing, the OID also performs bi-directional amplification of the optical signals to compensate for splitting losses, coupling losses, signal variations, and to provide additional gain. As a result, the power level of a signal entering one port is the same power level at which corresponding signals exit all other ports of the OID. The OID is useful in a number of network topologies, including but not limited to bus, point-to-point, star, ring, broken ring, hub, and a tree-like topology. The OID enables signal quality to be maintained throughout the network which is especially beneficial in the transmission of Radio Frequency and other analog signals.

21 Claims, 6 Drawing Sheets

U.S. PATENT DOCUMENTS

| | | |
|---|---|---|
| 3,943,358 A | 3/1976 | Reymond et al. |
| 4,054,366 A | 10/1977 | Barnoski et al. |
| 4,166,946 A | 9/1979 | Chown et al. |
| 4,234,969 A | 11/1980 | Singh |
| 4,249,266 A | 2/1981 | Nakamori |
| 4,301,543 A | 11/1981 | Palmer |
| 4,307,933 A | 12/1981 | Palmer et al. |
| 4,317,614 A | 3/1982 | Palmer |
| 4,366,565 A | 12/1982 | Herskowitz |
| 4,367,460 A | 1/1983 | Hodara |
| 4,400,054 A | 8/1983 | Biard et al. |
| 4,423,922 A | 1/1984 | Porter |
| 4,435,849 A | 3/1984 | Ilgner et al. |
| 4,446,515 A | 5/1984 | Sauer et al. |
| 4,457,581 A | 7/1984 | Johnson et al. |
| 4,482,980 A | 11/1984 | Korowitz et al. |
| 4,506,153 A | 3/1985 | Ohno |
| 4,543,574 A | 9/1985 | Takagi et al. |
| 4,545,074 A | 10/1985 | Balliet et al. |
| 4,554,511 A | 11/1985 | Braun |
| 4,577,184 A | 3/1986 | Hodara et al. |
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |
| 4,715,012 A | 12/1987 | Mueller, Jr. |
| 4,717,229 A | 1/1988 | Cutler |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,212,577 A | 5/1993 | Nakamura et al. |
| 5,222,166 A | 6/1993 | Weltha |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,471,342 A | 11/1995 | Junginger et al. |
| 5,479,082 A | 12/1995 | Calvani et al. |
| 5,483,233 A | 1/1996 | Pettitt et al. |
| 5,502,589 A | 3/1996 | Yamamoto et al. |
| 5,506,709 A | 4/1996 | Segal et al. |
| 5,508,689 A | 4/1996 | Rado et al. |
| 5,533,153 A | 7/1996 | Ota |
| 5,539,558 A | 7/1996 | Yonemura et al. |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A | 2/1998 | Sharma et al. |
| 5,745,479 A | 4/1998 | Burns et al. |
| 5,764,821 A | 6/1998 | Glance |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,880,863 A | 3/1999 | Rideout et al. |
| 5,894,362 A | 4/1999 | Onaka et al. |
| 5,898,801 A | 4/1999 | Braun et al. |
| 5,901,260 A | 5/1999 | Braun et al. |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,111,888 A | 8/2000 | Green et al. |
| 6,122,095 A | 9/2000 | Fatehi |
| 6,128,111 A | 10/2000 | Roberts |
| 6,140,920 A | 10/2000 | Roberts |
| 6,157,725 A | 12/2000 | Becker |
| 6,175,533 B1 | 1/2001 | Lee et al. |
| 6,345,137 B1 | 2/2002 | Imajo |
| 6,449,072 B1 | 9/2002 | Sian et al. |
| 2002/0018260 A1 | 2/2002 | Kisovec et al. |
| 2002/0101874 A1 | 8/2002 | Whittaker et al. |

FOREIGN PATENT DOCUMENTS

| | | |
|---|---|---|
| EP | 0 380 341 A2 | 8/1990 |
| EP | 0 393 293 | 10/1990 |
| EP | 0 414 333 A2 A3 | 2/1991 |
| EP | 0 905 936 A2 | 3/1991 |
| EP | 0 451 426 | 10/1991 |
| EP | 0 503 212 | 9/1992 |
| EP | 0 739 103 A2 | 10/1996 |
| EP | 0 744 797 A1 | 11/1996 |
| EP | 0 899 161 A1 | 3/1999 |
| EP | 0 350 720 A2 A3 | 1/2001 |
| EP | 1 246 378 A2 | 10/2002 |
| FR | 2574565 | 6/1986 |

| | | |
|---|---|---|
| GB | 2073877 | 10/1981 |
| GB | 2087679 | 5/1982 |
| GB | 2102232 | 1/1983 |
| GB | 2189961 | 11/1987 |
| GB | 2255683 | 11/1992 |
| JP | 11-87823 | 7/1989 |
| JP | 7-202921 | 8/1995 |
| JP | 9/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

International Search Report in related Application No. PCT/US03/29970.

International Search Report in related Application No. PCT/US03/03310.

International Search Report in related Application No. PCT/US03/03329.

International Search Report in related Application No. PCT/US03/10053.

Stewart D. Personick, *Optical Fiber Transmission Systems*, pp. 1–3 (1981).

H. Hodara, and E. Miles, "High–Speed Local Area Networks", *Fiber and Integrated Optics*; (1992) pp. 263–277.

N.A. Olsson, *Lightwave Systems With Optical Amplifiers*, Journal of Lightwave Technology, pp 1071–1082 (Jul., 1989).

ITU–T Recommendation G.681, Series G: Transmission Systems and Media, Digital Systems and Networks; Functional characteristics of interoffice and long–haul systems using optical amplifiers, including optical multiplexing (10/96).

ITU–T Recommendation G.692, Series G: Transmission Systems and Media, Digital Systems and Networks; Optical interfaces for multichannel systems with optical amplifiers (10/98).

Chart and figures for optical fiber cable and baseband transmission, *available at* http://www.microsoft.com/technet/WFW/wfw31/1_ch1.asp.

HDR 7.0 2 73; 7.0 Fiber Optic Ethernet—Types FOIRL and 10 BASE–F *available at* http://www.uni-trier.de/infos/ether/ethernet-guide/ethernet-guide.html.

3.0 IEEE Acronyms, *available at* http://spacey.net/ldavis/Design_Ethernet_Note.html, no date.

Fibre Channel—Overview of the Technology, Sep. 9, 2000, pp 1–9 *available at* http://fibrechannel.org/technology.

Bi–Directional Optical Backplane Bus for Board to Board Optoelectronic Interconnects, Glcherl Kim, Jinghual Fa and Ray T. Chen, 1–4 (Sep. 9, 2000) *available at* http://ece.u-texas.edu/projects/ece/mrc/profs/chen_projects/optbus/optbus.html.

SOME Bus (Simultaneous Optical Multiprocessor Exchange Bus)(Sep. 9, 2000) *available at* http://eb.ua-h.edu/~ cohen/some_bus/some_bus.html.

Integrated Explorations of the Spectral, Temporal and Spatial Degrees of Freedom 1 (Sep. 9, 2000) *available at* http://thebusinessedge.com/reruns/cito/sargent/sid001.htm.

Challenges in IP LANs on Higher–Dimensional Encoding (slide 4) (Sep. 9, 2000) *available at* http://thebusinessedge.com/reruns/cito/sargent/sld004.htm.

0034–P PCI 1–Gig Fibre Channel Optical Host Bus Adapter 1–4 *available at* http://solutions.sun.com/dbsearch/index.cgi?STATE=product&CMD=show&p_ld=58181 (Sep. 9, 2000).

Architectural and Engineering Issues for Building an Optical Internet 1–55 (Sep. 9, 2000) *available at* http://www.canet3.net/papers/ArchandEngissues.html.

Baker, *Monomode Fiber–Optic Design with Local– Area and Long–Haul Network Applications*, pp. 370–371.

Karim, *Chapter 9: Electro–Optical Devices and Systems*, Fiber–Optics–Based Devices and Systems, pp. 434–435.

Chinlon Lin, *Systems Applications of WDM Technologies in Optical Communications*, SPIE–International Society for Optical Engineering (Aug. 15–18, 1994).

Manuel Lopez–Amo, Loudon T Blair & Paul Urquhart, *Wavelength–Division–Multiplexed distributed optical fiber amplifier bus network for data and sensors*Optics Letter 1159–61(Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140–km 20–Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master", United Technologies Research Center, UTRC Technical Report RR–9500470 (Jun. 1995).

Technical Report CSRI–298 entitled "A New Binary Logarithimic Arbitration Method for Ethernet," by Mart Molle of Computer Systems Research Institute; pp. 1–57 (Apr. 1994).

WRL Research Report 88/4 entiltled "Measured Capacity of an Ethernet: Myths and Reality" by David R. Boggs, et al., printed by Digital Western Research Laboratory, Palo Alto, California (Sep. 1998) (pp. 1–31), originally SIGCOMM, Stanford, California, Aug. 1988.

Yamashita, et al., "Studies of a system gathering multi–channel visual signals using a single optical fiber and a bi–directional optical amplifier," *T.IEE Japan*, 119–C(12): 1528–1534 (1999).

Kempainen, "Optical Networking lightens carrier–backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30–36 (Sep. 2000).

Press Release entitled "Lucent Technologies announces record–breaking 320–channel optical networking system," (pp. 1–2) (Apr. 17, 2000).

Iannone, et al., "A 160–km transparent metro WDM ring network featuring cascaded erbium–doped waveguide amplifiers," published by Optical Society of America (2000).

"Performance Management –Management of SONET Networks—White Paper," Clear Communications, *Sonet and Performance Management*, Issue 1, Apr. 1996 (pp. 1–21).

Cisco Wavelength Router Manager—Data Sheet, www.cisco.com/warp/public/cc/so/neso/otso/cwrm_ds.htm (Apr. 25, 2001).

Keyerserling, A. and R.C.L., "Chapter 2: Number, Dimensions, Manderlbrot, Chaos, 4 Attractors, Music and Color," www.chanceandchoice.com/ChanceandChoice/chapter2.html.

Gallardo, et al., "Fast Simulation of Broadband Telecommunications Networks Carrying Long–Range Dependent Bursty Traffic," Preceedings of the 1999 Winter Simulation Conference , pp. 374–381 (Winter 1999).

Willnger, et al., "Self–Similarity Through High–Variability: Statistical Analysis of Ethernet LAN Traffic at the Source Level," pp. 1–31 (Apr. 15, 1997).

DeCotignie, J.D. , et al., "Producer–Distributor–Consumer Model on Controller Area Network," Proceedings of the IFAC/IFIC Workshop, Real Time Programming, 1995, pp. 35–42, XP002074139, Oxford, Great Britain.

Liew, "A Broad–Band Optical Network Based on Hierarchial Multiplexing of Wavelengths and RF Subcararies," *Journal of Lightwave Technology*, 7(11):1825–1838 (1989).

Al–Raweshidy and Komaki (Editors), "Basic Microwave Properties of Optical Links," *Radio Over Technologies for Mobile Communication Networks*, pp. 7–16 (Published by Artech House, Norwood, Massachusetts) (2002).

Fibre Channel Overview http://his.web.cem.ch/HISfcs/spec/overview.htm, pp. 1–10 (Nov. 5, 2002).

Ethernet FAST Ethernet Fiber Opticc Media Converters, http://www.versitron.com/Ethernet.html, 2 pages (Nov. 5, 2002).

HomeNetHelp.com, http://www.homenethelp.com/web/explain.about–hubs–and–switches.asp, 5 pages (Nov. 5, 2002).

Fibre Channel, http://www.iol.unh.edu/training/fc/fc_tutorial.html, 22 pages (Nov. 5, 2002).

* cited by examiner

OPTICAL INTERFACE DEVICES HAVING BALANCED AMPLIFICATION

RELATED APPLICATIONS

This application claims priority to, and incorporates by reference, provisional application Ser. No. 60/414,746 entitled "Optical Interface Devices Having Balanced Amplification," filed on Sep. 27, 2002.

FIELD OF THE INVENTION

The invention relates generally to systems and methods for providing an optical interface and, more particularly, to systems, methods, and devices for routing optical signals and for compensating for optical losses.

BACKGROUND

Optical communication has many benefits over transmission of signals in an electrical domain. For one, the losses in an optical medium are much less than those incurred in an electrical medium. As a result, signals can travel greater distances through an optical fiber before any necessary regeneration. Another advantage is that optical signals are much less susceptible to electromagnetic radiation. An electrical medium, such as a coaxial cable, generates electromagnetic fields as the signals travel down the cable. These electromagnetic fields can induce noise in neighboring cables and cause interference with the signals traveling on such cables. In addition, noise can be induced upon the coaxial cable signals from the electromagnetic fields generated by the neighboring cables. For these and many other reasons, optical communication is often the preferred mode of communication.

In optical communication networks, as with electrical communication networks, the network needs some manner of adding and dropping signals at points throughout the network. One approach to adding and dropping signals onto an optical medium involves the use of regeneration devices. These regeneration devices convert the optical signals traveling along the optical medium into the electrical domain and route these electrical signals to terminal equipment. Any electrical signals that need to be added and forwarded on to the optical medium are added to the electrical signals that had been detected. A combination of these signals is then converted into optical signals and passed along the optical medium. Some drawbacks to this approach include the loss of signal quality in needing to convert the optical signals into electrical signals and then back to optical signals at each node or station throughout the network, the accompanying loss of speed and increase in latency, and the limitations in bandwidth associated with the electrical medium.

Rather than coupling signals in the electrical domain, a preferred device for coupling signals operates purely in the optical domain. By maintaining the signals in the optical domain, the coupling device can maintain signal quality, operate at higher speeds, and at an increased bandwidth. U.S. Pat. No. 5,901,260, which is incorporated by reference, is an example of an optical interface device operating solely in the optical domain. This optical interface device is useful in routing optical signals traveling along either direction on an optical bus to a node and for directing signals from that node onto the bus in both directions. With such an optical interface device, signals that originate at any node within a network can be transmitted to every other node and, conversely, signals from all of the nodes are received at each node. This type of optical interface device is useful in an optical transport system described in U.S. Pat. No. 5,898,801, which is incorporated by reference.

While optical interface devices have many advantages over electrical interface devices, optical interface devices can still limit the performance of the network. For example, each time optical signals are diverted off of an optical bus to a node, the optical interface device necessarily reduces the optical signal level. Consequently, after a certain number of nodes, the remaining signal has such a low optical signal to noise level that the signal is underneath the noise floor and can no longer be detected. In addition to these losses due to splitting of the signal at each node, the optical interface device also introduces losses resulting from the imperfect coupling of light from an input optical fiber to the optical interface device, from the optical interface device to an exit optical fiber, and from the optical interface device to the terminal equipment. The optical interface device therefore introduces losses at each node, which causes the signal to vary at points throughout the network.

U.S. Pat. No. 5,898,801 describes a network having a number of optical interface devices that bi-directionally amplifies the optical signals. By amplifying the optical signals traveling along the optical bus, the number of nodes along the network can be greatly increased. The optical amplifier may comprise a fiber amplifier and, more particularly a rare earth doped fiber amplifier. The doped fiber amplifier is energized with an excitation light, typically at 980 nanometers. This fiber amplifier may be located between nodes along the bus and/or between the terminal equipment and the optical interface device.

As described in U.S. Pat. No. 5,898,801, the length of the rare earth doped fiber influences the amount of amplification provided by the fiber amplifier. By placing the fiber amplifiers between each node, the fiber amplifiers can compensate for losses incurred by splitting the signals at each node. Thus, a signal that originates at one end of the bus can travel along the bus, have a fraction of the signal diverted at each node, and then be amplified after incurring those losses. This approach to amplification, as mentioned above, greatly increases the number of nodes that may be in a network. This approach to amplification, however, is more challenging when the network topology is dynamic. For example, a network may have different amplification needs with an initial set of nodes than it would need later when nodes are added at other points within the network, are removed from the network, or are placed at different points within the network. The placement of fiber amplifiers at certain points may therefore not be optimal for a different configuration of nodes on the network. As a result, the signal level and quality of the signal may vary throughout the network. For certain types of signals, these variations may not affect performance of the network overall. On the other hand, for other types of signals, such as radio frequency (RF) signals and other analog signals, maintaining a consistent signal dynamic range and waveform quality throughout the network is imperative.

SUMMARY

The invention addresses the problems above by providing systems, networks, and devices for coupling and routing optical signals. An optical interface device according to a preferred embodiment of the invention has three ports with the signals entering any one of the ports being split and routed to each of the other two ports. The optical interface device maintains the optical signal level so that the level of the signal entering one of the three ports is the same level at which the signal exits the other two ports.

The optical interface device is very beneficial in the use of networks carrying radio frequency (RF) and other analog signals as it provides the least interference with the preservation of the quality of the dynamic range and waveform of these signals. The optical interface device may be used in many different network topologies, such as but not limited to, a bus, ring, star, or tree-like topology. In the preferred embodiment, the optical interface device has a balanced set of fiber amplifiers providing the necessary amplification of these signals. These fiber amplifiers are pumped with an excitation light, such as at 980 nanometers.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1:
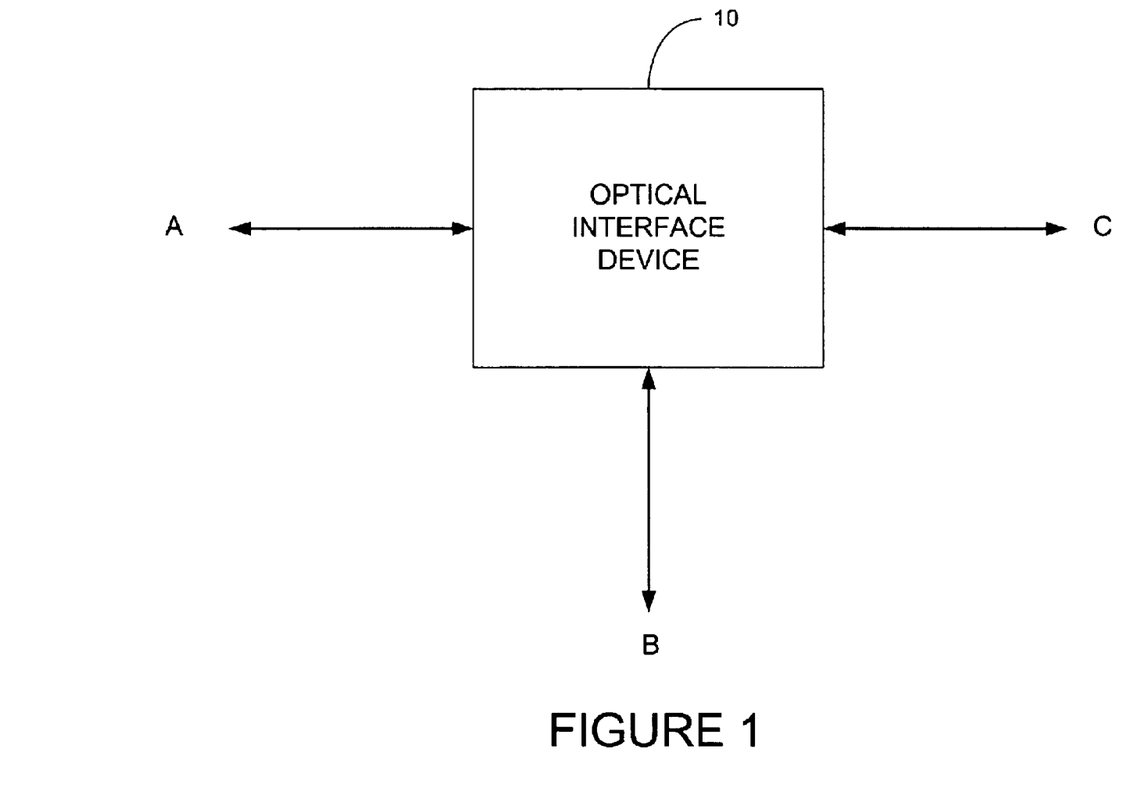
FIG. 1 is a block diagram of an optical interface device according to a preferred embodiment of the invention.

An optical interface device (OID) 10 according to a preferred embodiment of the invention will now be described with reference to FIG. 1. The OID 10 has a number of ports, in this example three ports A, B, and C, and operates such that the input to any one of its ports is split and routed to each of the other ports. For example, a signal entering port A is split and directed to each of the ports B and C. Similarly, signals entering port B are split and routed to ports A and C and signals entering port C are split and routed to ports A and B.

The OID 10 operates solely in the optical domain and thus does not require any electrical regeneration of the optical signals. Because the optical signals are not converted into electrical signals and then regenerated as optical signals, the OID 10 is able to operate at higher speeds and have a lower latency than electrical interface devices. The OID 10 is also able to preserve signal quality by avoiding the deterioration that often occurs when converting signals between the electrical and optical domains.

The OID 10 furthermore provides balanced amplification of the signals entering each of the ports. This balanced amplification operates such that the power level of the signals entering any of the ports is equal to the power level of the corresponding signals that exit the other two ports. For example, a 10 dBm optical signal entering port A is split into two components, routed to ports B and C, and each of the signals at ports B and C is a 10 dB optical signal.

The OID 10 may operate in a number of different environments, including a variety of different network topologies. One such network is the simple interconnection of two or more devices coupled to the ports A, B, and/or C. Thus, the OID 10 may interconnect a first device coupled to port A with a second device on port B. Additionally, the OID 10 may couple each of the first and second devices on ports A and B, respectively, with a third device on port C. As mentioned above, the routing of signals between each of the ports A, B, and C is performed passively without any conversion into the electrical domain.

Figures 2A, 2B:
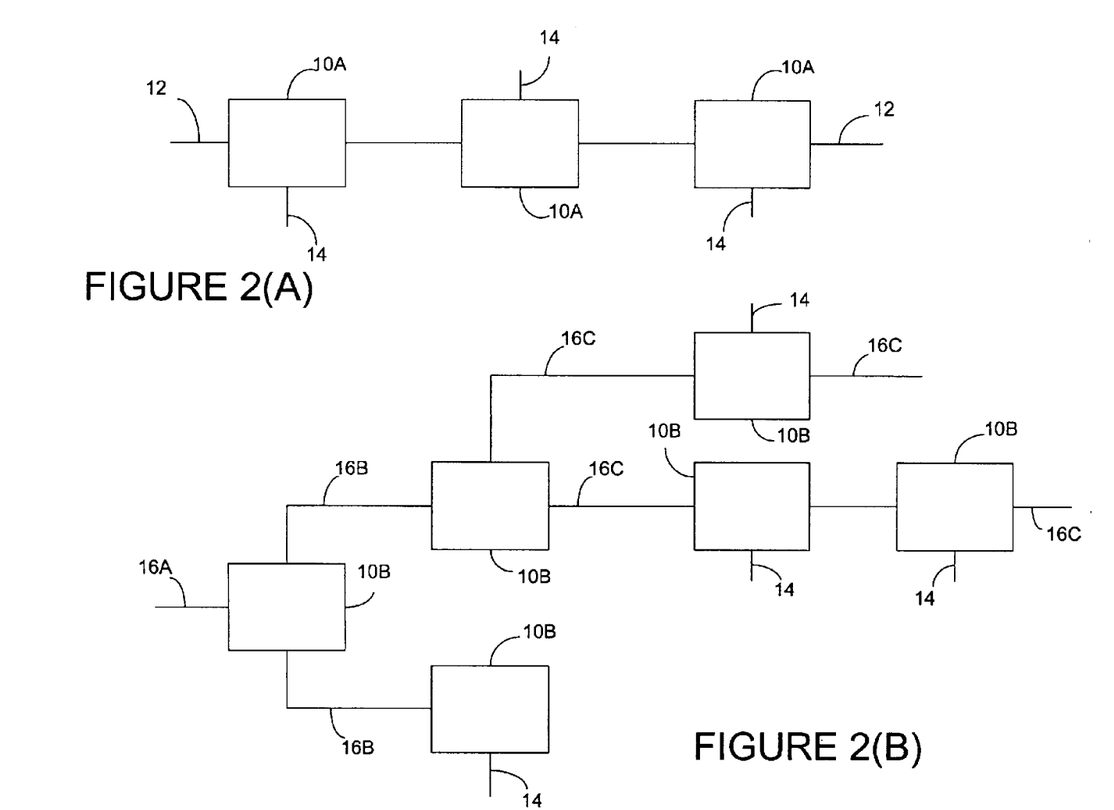
FIGS. 2(A) and 2(B) are exemplary networks having the optical interface device of FIG. 1.

FIGS. 2(A) and 2(B) illustrate two other network topologies within which the OID 10 may operate. With reference to FIG. 2(A), the network has a bus 12, such as a bi-directional bus, which interconnects a number of OIDs 10A. In the example shown in FIG. 2(A), each OID 10A has a first port receiving signals from a preceding OID 10A and a second port passing signals to the next OID 10A. Each OID 10A also has a line 14 for providing and/or receiving signals from terminal equipment. Each OID 10A can be associated with a node or point within the network, such as a workstation on a Local Area Network (LAN). The OID 10A is not limited to such a use and FIG. 2(A) illustrates the ability of the OID 10A to operate in a bus network. As will be apparent from this bus topology example, the OIDs 10A can also operate in a ring, broken ring, or point to point network topology.

FIG. 2(B) provides an example of a tree-like network having a number of OIDs 10B. The network has a first OID 10B that couples the signals on a first line 16A with signals traveling along branch lines 16B. These branch lines 16B may feed into additional OIDs 10B along that branch and/or into OIDs B along different branches. For instance, the upper branch 16B is coupled to an OID 10B that is connected to lines 16C. In addition to this tree-like topology, the OIDs 10B may also operate in a star network as well as those having hubs and/or switches.

For the networks shown and suggested by both FIGS. 2(A) and 2(B), the OIDs 10 enable signals generated anywhere in the network to be routed to any other OID 10 with minimal loss in signal quality or signal power level. This ability to maintain the signal waveform is of utmost importance in the transmission of analog signals, especially Radio Frequency (RF) signals. RF and other analog signals contain a great deal of information within the waveform itself and within the signal level. As a result, when an analog signal is transmitted at one point within a network, all other nodes within the network must receive the same exact signal in order to provide consistency and integrity throughout the network.

Figure 3:
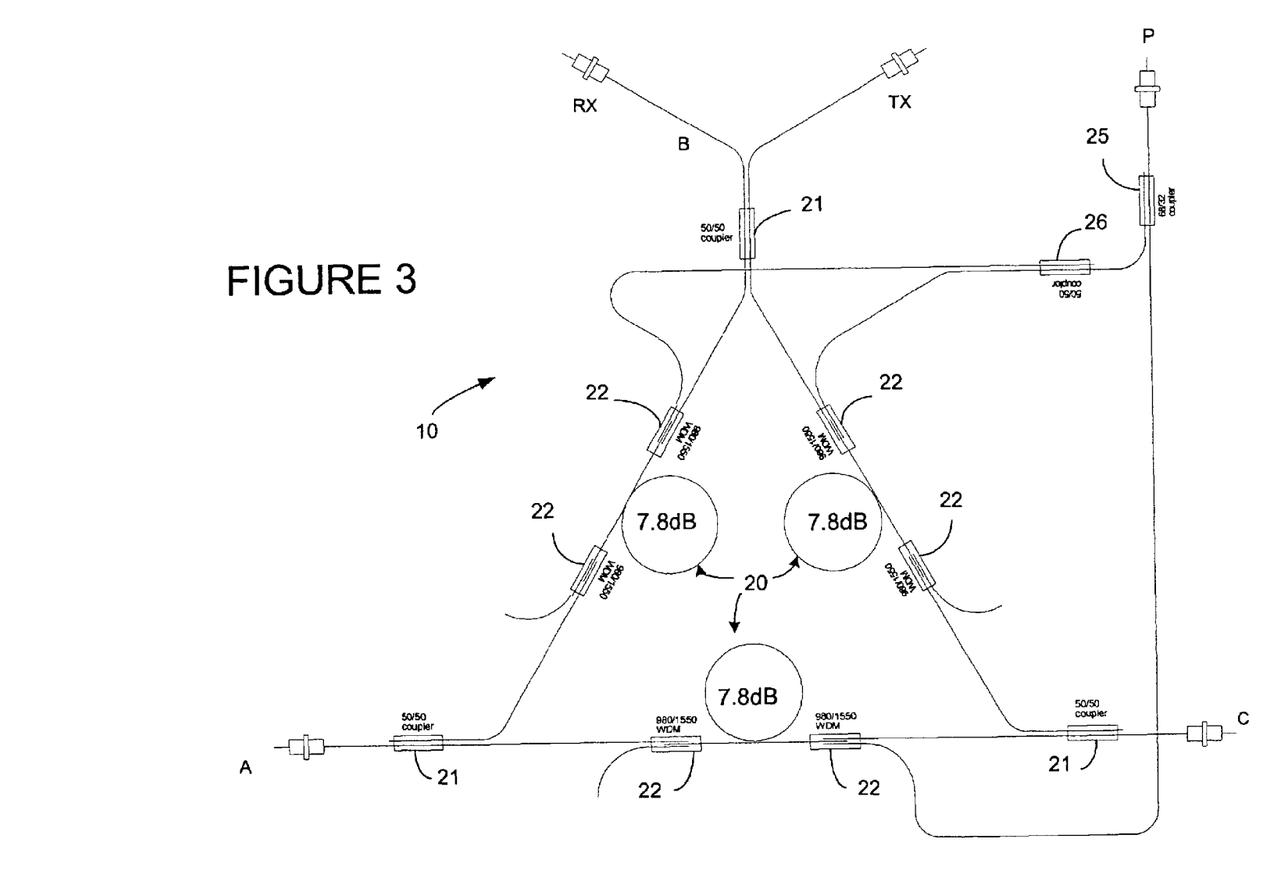
FIG. 3 is a more detailed diagram of the optical interface device of FIG. 1.

The OID 10 may be fabricated with any technology. FIG. 3 provides an example of the OID 10 fabricated using discrete components. The OID 10 has three ports A, B, and C. A 50/50 coupler 21 is positioned at each port and splits the incoming signal into two equal components that are directed along one of the three legs within the OID 10. Thus, each leg of the OID 10 interconnects one of the ports to the other two ports. The 50/50 couplers 21 at each port also combine the signals traveling in the opposite direction along the legs which originate from the two other ports.

For example, a signal entering port A is divided into two components A1 and A2 by the 50/50 coupler 21 with component A1 traveling to port B and component A2 traveling to port C. Similarly, a signal B at port B is divided into components B1 and B2 by the 50/50 coupler 21 at port B and a signal C at port C is divided into components C1 and C2 by the 50/50 coupler 21 at port C. The 50/50 coupler 21 at port A combines the signals B1 and C1 and route them so they exit port A. Similarly, the 50/50 coupler 21 at port B combines the signals A1 and C2 and route them so they exit port B and the 50/50 coupler 21 at port C combines the signals A2 and B2 and route them so they exit port C.

Each leg provides for bi-directional amplification of the optical signals. The OID 10 has fiber amplifiers 20 and, more preferably rare earth doped fiber amplifiers, such as erbium doped fiber amplifiers. The amplifiers 20 preferably amplify the optical signals to compensate for optical splitting and coupling loss, which in the Figure are shown by 7.8 dB. This amplification compensates for the 6 dB splitting loss resulting from the 50/50 coupler 21 as well as an additional 1.8 dB loss from losses associated with coupling of the rare earth doped fiber, optional connectors, lengths of fiber and manufacturing component variations. Because the coupling losses associated with the OID 10 will vary with the precise couplers used and the optical medium to which the OID is coupled, the precise amount of amplification provided by the fiber amplifiers 20 may vary.

The fiber amplifiers 20 receive an excitation light from a pump P which is divided into three essentially equal components and provided to each leg through a 68/32 coupler 25 and a 50/50 coupler 26. The excitation light is coupled to each leg of the OID 10 through couplers 22, which are preferably wavelength division multiplexers 22. The excitation light in this example is at 980 nm while the optical signals have wavelengths of light within the 1550 nm window.

Figure 4:
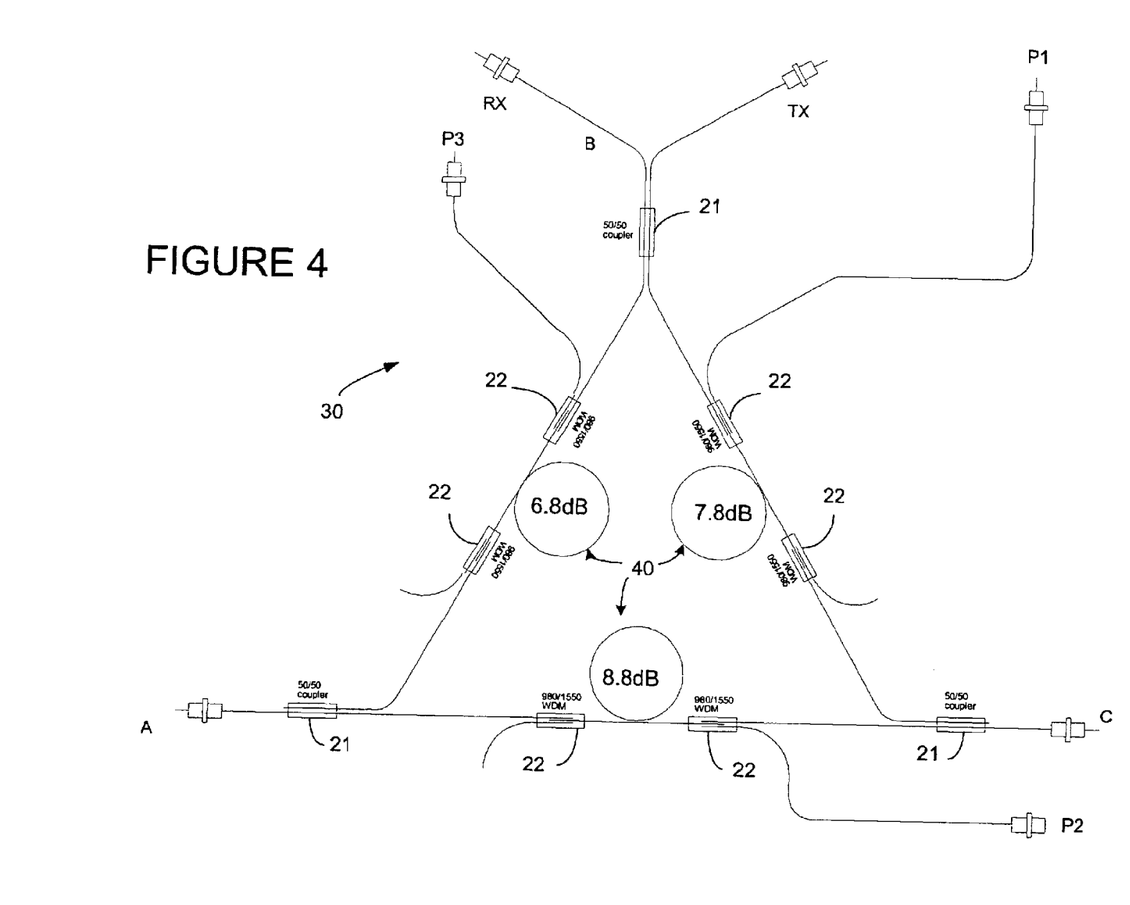
FIG. 4 is a more detailed diagram of the optical interface device of FIG. 1 according to another embodiment of the invention.

According to another embodiment shown in FIG. 4, an OID 30 may include a plurality of pumps, such as three pumps P1, P2, and P3 for separately providing excitation light to each of the three legs. With this example, the OID 30 need not have the couplers 25 and 26 for dividing the excitation light into thirds for each of the three legs. In this manner, each of three erbium loops 40 may be pumped from independent power supplies P1, P2, and P3 so that they may be independently regulated. In the example shown in FIG. 4, each of the rare earth amplifiers 40 has its own controllable 980 nm excitation light sources, P1, P2 and P3, which can independently provide different amplification levels in each leg, as shown by example as 6.8 dB, 7.8 dB and 8.8 dB of gain. The amplification may differ in the legs if the losses and the signals traveling in each leg are not the same.

Figure 5:
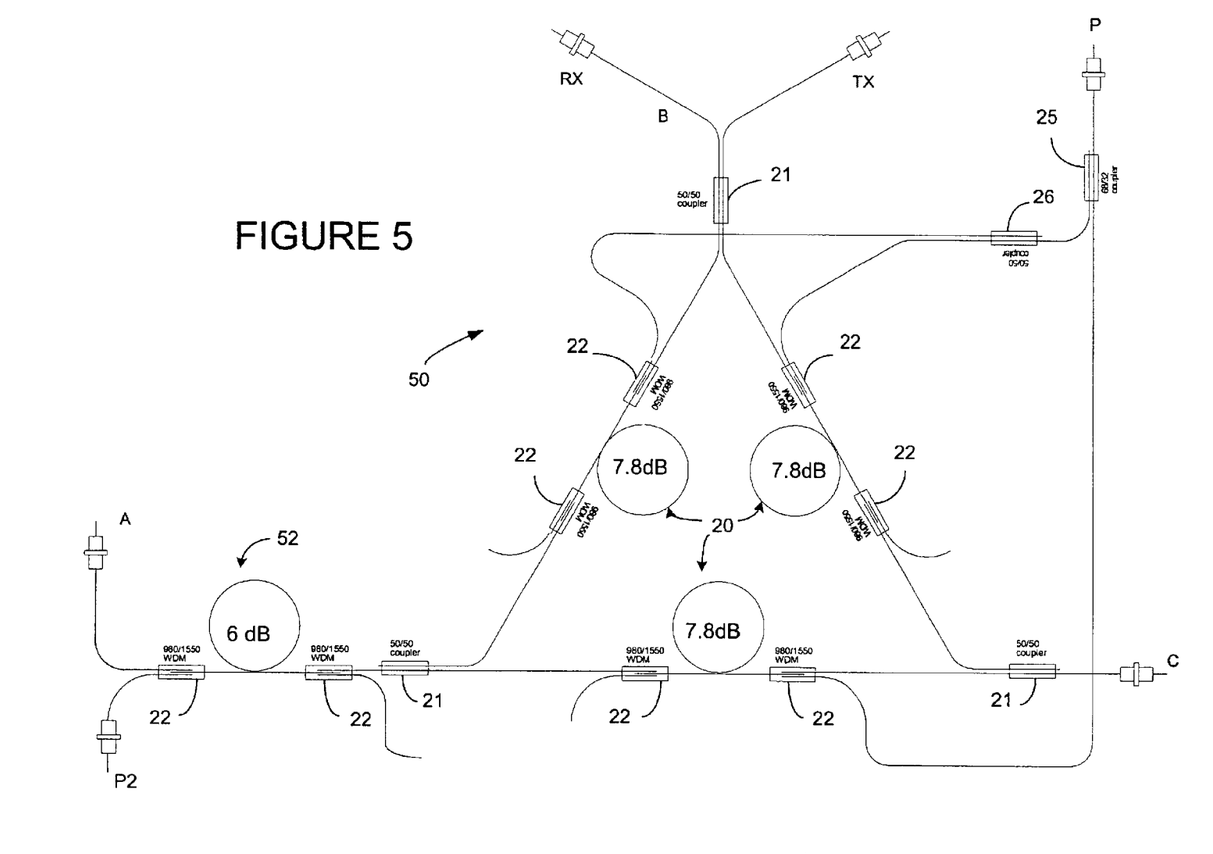
FIG. 5 is a detailed diagram of an optical interface device according to another embodiment of the invention.

FIG. 5 is yet another embodiment of an OID 50 according to an embodiment of the invention. The OID 50 is similar to the OID 20 shown in FIG. 3 but has an additional optical amplifier 52. The optical amplifier 52 may comprise any type of amplifier and, in the example shown in FIG. 5, is a fiber amplifier. The fiber amplifier 52 receives an excitation signal from a pump P2. The amplifier 52 enables some additional amplification of the optical signals beyond that offered by the amplifiers 20, such as but not limited to 6 dB. While just one additional amplifier 52 is shown, it should be understood that the OID 50 may comprise additional amplifiers for amplifying optical signals originating and/or exiting from each of the ports A, B, and C. Furthermore, while the amplifier 52 is illustrated as being at a location other than on one of the legs, the amplifier 52 may be located on one of the legs. As a result, the amplifiers 20 may be configured not only to amplify the optical signals to compensate for coupling, splitting losses, and signal variations but may also provide some additional gain.

Figure 6:
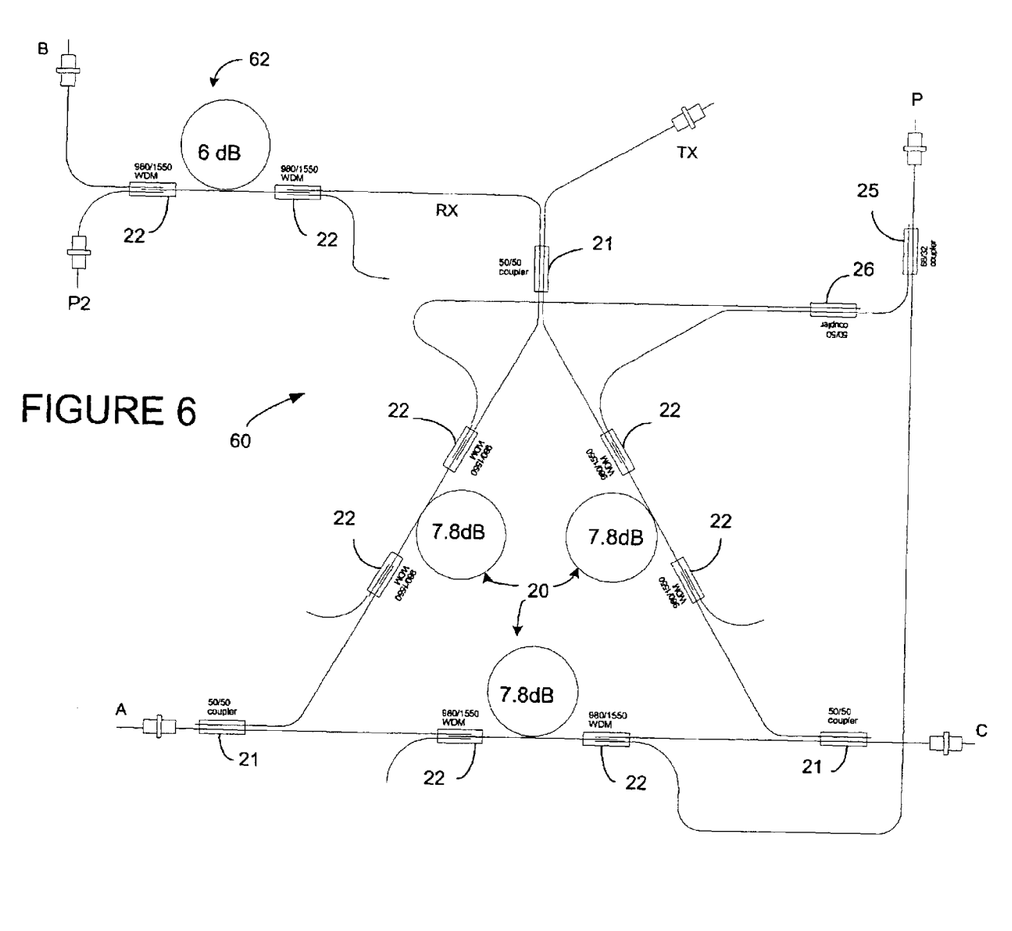
FIG. 6 is a detailed diagram of an optical interface device according to a further embodiment of the invention.

FIG. 6 is another example of an OID 60 according to an embodiment of the invention. As shown in this figure, the OID 60 has optical amplifiers 20 within each leg of the OID and has an additional optical amplifier 62 located on the receiving side of port B. Thus, optical signals received at port B from either port A or port C undergo amplification through fiber amplifiers 20 to compensate for coupling, splitting losses, signal variations and undergo amplification through amplifier 62 to provide additional gain.

The OIDs 10 shown in FIGS. 3 to 6 are non-limiting examples of how an OID may be fabricated. In addition to using discrete components, the OID may be fabricated using semiconductor technology, through polymers, ion migration, and other existing or future developed techniques.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What we claim:

1. An optical interface device, comprising:
    a first port;
    a second port;
    a third port;
    each of the first, second, and third ports for receiving optical signals;
    a first coupler for splitting optical signals from the first port into a plurality of optical signal components and for routing one of the optical signal components to each of the second and third ports;
    a second coupler for splitting optical signals from the second port into a plurality of optical signal components and for routing one of the optical signal components to each of the first and third ports;
    a third coupler for splitting optical signals from the third port into a plurality of optical signal components and for routing one of the optical signal components to each of the first and second ports;
    a first optical amplifier located between the first and second ports for amplifying optical signals routed between the first and second ports;
    a second optical amplifier located between the second and third ports for amplifying optical signals routed between the second and third ports;
    a third optical amplifier located between the first and third ports for amplifying optical signals routed between the first and third ports;
    wherein each of the first, second, and third optical amplifiers has a gain that is sufficient to compensate for coupling losses associated with the first, second, and third ports, respectively, and splitting losses associated with the first, second, and third splitter, respectively.

2. The optical interface device as set forth in claim 1, wherein the first, second, and third amplifiers comprise fiber amplifiers.

3. The optical interface device as set forth in claim 1, wherein the first, second, and third couplers comprise 50/50 splitters.

4. The optical interface device as set forth in claim 1, wherein the optical interface device has more than three ports.

5. The optical interface device as set forth in claim 1, wherein the gain is the same for each of the first, second, and third optical amplifiers.

6. The optical interface device as set forth in claim 1, wherein the gain in the first optical amplifier differs from the gain in the second and third optical amplifier.

7. The optical interface device as set forth in claim 1, further comprising a fourth optical amplifier associated with the first port, the fourth optical amplifier for providing optical amplification of signals traveling between the first port and the first coupler.

8. The optical interface device as set forth in claim 1, wherein each of the first, second, and third optical amplifiers receive an excitation signal from a common pump.

9. The optical interface device as set forth in claim 1, wherein the first, second, and third optical amplifiers receive excitation signals from different pumps.

10. The optical interface device as set forth in claim 1, wherein the first, second, and third optical couplers split the optical signals into equal optical components.

11. An optical interface device, comprising:
  means for receiving an optical signal from a first port;
  means for separating the optical signal into a plurality of signal components;
  means for amplifying the optical signal components to compensate for losses associated with the receiving means and the separating means, the amplifying means generating amplified optical signal components; and
  means for passing the amplified optical signal components from at least a second port and a third port.

12. The optical interface device as set forth in claim 11, wherein the receiving means comprises a port.

13. The optical interface device as set forth in claim 11, wherein the separating means comprises a splitter.

14. The optical interface device as set forth in claim 11, wherein the amplifying means comprises a fiber amplifier.

15. The optical interface device as set forth in claim 11, wherein the amplifying means amplifies each signal component with the same gain.

16. The optical interface device as set forth in claim 11, wherein the amplifying means amplifies the signal components with different gains.

17. The optical interface device as set forth in claim 11, further comprising second amplifying means for amplifying the optical signal.

18. A method for routing an optical signal from a first line onto at least a second line and a third line, comprising:
  receiving the optical signal from the first line;
  splitting the optical signal into a plurality of signal components;
  amplifying each of the signal components to compensate for coupling and splitting losses, the amplifying of the signal components resulting in amplified signal components; and
  passing the amplified signal components onto each of the second line and the third line.

19. The method as set forth in claim 18, wherein splitting comprises splitting the optical signal into equal optical signal components.

20. The method as set forth in claim 18, wherein amplifying comprises amplifying the optical signal components to a level greater than a level of the optical signal.

21. The method as set forth in claim 18, wherein splitting comprises splitting the optical signal into two optical signal components and the passing comprises passing the two optical signal components onto the second and third lines.

* * * * *